April 19, 1955
E. J. KACZOR
2,706,667
LUBRICATING SYSTEM FOR BEARINGS
Filed May 1, 1951
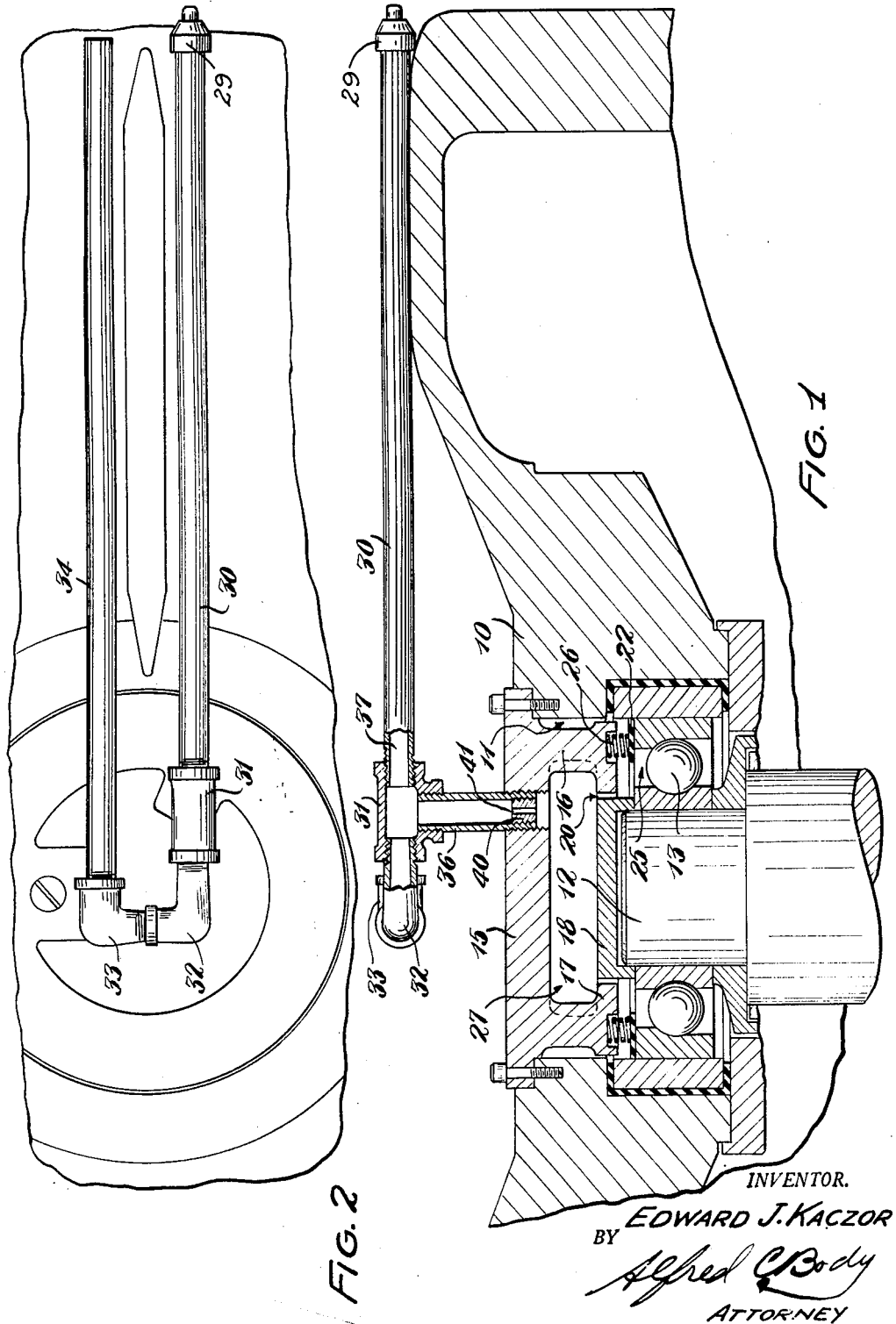
INVENTOR.
EDWARD J. KACZOR
BY
Alfred C. Body
ATTORNEY

United States Patent Office 2,706,667
Patented Apr. 19, 1955

2,706,667

LUBRICATING SYSTEM FOR BEARINGS

Edward J. Kaczor, Cleveland, Ohio, assignor to The Ohio Crankshaft Company, Cleveland, Ohio, a corporation of Ohio Application May 1, 1951, Serial No. 224,035

2 Claims. (Cl. 308—121)

This invention pertains to the art of lubrication and, more particularly, to a lubricating system for preventing overpacking of a bearing or the like with grease.

The invention is particularly adapted to totally enclose antifriction bearings which cannot be visually inspected to determine if the proper amount of lubricant has been supplied thereto and the invention will be described with particular reference to such an application, although it will be appreciated that the invention has broader applications.

In the art of lubricating roller bearings with greases and the like, one of the dangers is overlubricating. Overlubricating causes overheating and, many times, a shortened life of the bearing. Also, the excess of grease is many times forced into other parts of the rotating equipment through greased seals and the like causing damage there. An even greater danger in the lubrication of roller bearings is underlubrication so the operators of the equipment normally tend to overlubricate as the lesser of two evils.

Many systems have been proposed for supplying measured amounts of lubricant or grease to roller bearings. Normally, they are unduly complicated or undependable under certain types of operating conditions.

The present invention contemplates a lubricating system for bearings and the like which is simple in construction, economical to manufacture and positively indicates when the bearing has received the proper amount of lubricating grease.

In accordance with the invention, there is generally provided an elongated main lubricant passage through which grease is adapted to be forced from an inlet end to an open discharge end. Intermediate the ends of this main passage is a sidewardly extending passage communicating with the space to be lubricated. This side passage is so designed, shaped or dimensioned as to have a resistance to the movement of grease therethrough less than but in predetermined relationship to the resistance to the flow of grease through the main passage between the side passage and the open discharge end so that, as grease is pumped into the main passage, it first flows through the side passage until the space to be lubricated commences to fill and creates a resistance to the further flow of grease thereinto; which resistance, when added to the resistance of the side passage, is then greater than the resistance of the flow of grease from the side passage to the discharge end, whereby the grease flows out the discharge end indicating to the operator that the required amount of grease has been supplied to the bearing.

An object of the invention is the provision of a new and improved lubricating system for bearings and the like which is simple in construction and which positively indicates to the operator when the bearing has received the desired amount of lubrication.

Another object of the invention is the provision of a new and improved lubricating system for bearings and the like which comprises a continuous main passage open at both ends through which grease is adapted to be forced, the passage having determinable resistances to the flow of grease therethrough, the passage also having a side passage communicating with the space to be lubricated and being so designed and proportioned as to present a resistance to the flow of grease therethrough less than the resistance to the flow of grease between the side passage and the discharge end of the main passage whereby lubricant forced into the main passage will first fill the space to be lubricated whereby the resistance to the further flow of grease into the space is increased so that grease is then discharged from the discharge end of the main passage, indicating to the operator that the space to be lubricated is filled.

Another object of the invention is a new and improved lubricating system for rotating bearings which comprises a bearing to be lubricated, a lubricant-storage space adjacent the bearing, means restricting the communication of the storage space with the bearing, and lubricant-metering means for supplying lubricants to the storage space, the lubricant-supplying means comprising a continuous lubricant supply and discharge tube open at the discharge end and a branch tube communicating the junction of the tubes with the lubricant-storage space, the side tube being so designed and proportioned so as to provide a resistance to the flow of lubricant therethrough just less than the resistance of the flow of lubricant through the discharge end; whereby, as the lubricant space fills up and commences to flow through the restricted space between the storage space and the bearing, the resistance to the further flow of lubricant into the storage space is greatly increased above that of the discharge tube and lubricant is forced from the open end of the discharge tube, indicating to the operator that the lubricating space has been filled.

The invention will be particularly set forth and defined in the claims appended to the end of this specification. The invention may take physical embodiment in a number of different-appearing equivalent forms and arrangement of parts and a preferred embodiment of one of such arrangements will be described in detail in this specification and illustrated in the drawing which is a part hereof, and wherein:

Figure 1 is a side sectional view of the upper end of rotating equipment having lubricating means embodying the present invention; and Figure 2 is a top elevational view partly in section of Figure 1.

Referring now to the drawings wherein the showing is for the purposes of illustrating the invention only and not for the purposes of limiting the invention, Figure 1 shows a side sectional view of an end bell 10 of rotating mechanical equipment having a central opening 11 into which the upper end of a shaft 12 extends and is rotatably supported therein by a roller bearing 13. The end bell, shaft and roller form no part of the present invention and may be of conventional construction. A bearing cap 15 is fastened to the upper side of the end bell, closing the central opening 11. This bearing cap 15 has, adjacent its outer edge, a downwardly-extending circular portion 16 which has, on its lower edge, a radially inwardly-extending flange 17 which extends toward but is radially spaced from an inverted cup-shaped cap 18 disposed on the upper end of the shaft 12 forming an annular space 20 of restricted radial dimension between the flange and the cap. A washer 22 rests on the upper side of the outer race of the bearing 13 and extends radially inwardly a portion of the distance between the outer and the inner upper surfaces of the bearing races providing a restricted annular space 25. This washer is held in engagement with the upper surface of the outer race by a plurality of circumferentially spaced helical spring members 26 bearing on their lower end on the upper side of the washer and at their upper end in a groove on the bottom side of the bearing cap portion 16.

The bearing cap defines, together with the upper side of the shaft cap, a lubricant-receiving storage space 27 to which lubricant is supplied under pressure. This lubricant must then move through the annular space 20 and thence through the annular space 25 down to the rollers of the roller bearing 13. Each of these passages is carefully proportioned so as to provide a predetermined amount of resistance to the flow of lubricant thereto.

A labyrinth-type oil seal may be provided on the lower side of the roller bearing 13 to prevent the flow of lubricant into the interior of the rotating equipment. This labyrinth seal, while referred to, forms no part of the present invention and is not shown in the drawings.

In accordance with the invention, lubricant-supply means for the lubricant-storage space 27 are provided which, in the embodiment shown, comprise a lubricant-supply pipe 30 extending radially inwardly from the outer peripheral edge of the equipment, across the top of the end bell, to a point over the lubricant-storage space 27; a T fitting 31; a pair of 90-degree elbows 32, 33 and a lubricant-discharge pipe 34. As shown, the supply pipe 30 and the discharge pipe 34 extend in parallel relationship and the discharge end of the pipe 34 is adjacent the inlet end of the pipe 30. A short nipple 36 is threaded into an opening on the upper end of the bearing cap and into the branch of the T fitting 31 and communicates the passage 37 of the lubricant-supply pipe 30 with the lubricant-storage space 27. If desired, a lubricating fitting 29 may be provided on the entrance end of the lubricant-supply pipe 30.

It will be appreciated that the passages in the pipe 30 and 34 and the pair of 90-degree elbows 32, 33 offer a definite resistance to the passage of lubricant therethrough. In particular, the passage in the discharge pipe 34 will offer a greater resistance to the movement of lubricant than will the passage in the nipple 36 into the lubricant-storage space 27. If this condition were allowed to prevail, larger amounts of lubricant than desired might be forced into the storage space and then down to the bearing itself. Accordingly, in accordance with the invention, means are provided in the side passage communicating with the storage space for increasing the resistance to the flow of lubricant into the storage space to an amount just less than the resistance to the flow of lubricant through the two elbows 32, 33 and the discharge pipe 34. In the embodiment shown, this means comprises a plug 40 having a small orifice 41 which is threaded into the nipple 37. The size of the hole 41 will vary for different installations and for different-diameter supply and discharge pipes and must be determined empirically for each type of installation. In a preferred embodiment, the size of the opening 41 is proportioned so that lubricant will be forced into the lubricant-storage space until it is full and then is commenced to be forced through the small spaces 20 and 25 to the roller bearing itself. The resistance to the flow of lubricant offered by these two spaces when added to the resistance to the flow of lubricant through the orifice 41 is greater than the resistance to the flow of lubricant through the two elbows 32, 33 and the discharge 34 so that, as soon as the storage space 27 has been completely filled with lubricant and the lubricant commences to be forced through the spaces 20, 25, lubricant will, instead, be forced through the discharge tube 34 and out of its discharge end. As this discharge end is immediately adjacent the inlet end of the lubricant-supply pipe, the operator can readily see when a sufficient amount of lubricant has been supplied to the lubricant-storage space.

The lubricating system just described has proven to be particularly effective in actual practice and has served to eliminate all difficulties of overpacking of the upper roller bearing in rotating equipment manufactured by applicant's assignee.

While a particular embodiment of the invention has been described for the purposes of illustrating the invention, it will be appreciated that modifications and alterations differing radically in appearance and form will occur to others upon a reading and understanding of this specification. It is my intention to include all such modifications and alterations insofar as they come within the scope of the appended claims.

Having thus described my invention, I claim:

1. In rotating equipment, a vertical rotating shaft, a bearing member about but spaced below the end of said shaft and supporting said shaft for rotation in a housing member, a bearing cap forming with the end of said shaft and said housing member, a lubricant-storage space, restricted means communicating said storage space with said bearing member and means for supplying lubricant to said storage space, said lubricant supply means comprising an elongated tube through which lubricant is adapted to be forced from an inlet end to a discharge end, a tube communicating said storage space with said elongated tube at a point spaced a substantial distance from its discharge end and an orifice in said communicating tube to restrict the flow of lubricant therethrough, said orifice offering a resistance to the flow of lubricant therethrough just less than the resistance to the flow of lubricant from said communicating tube to the discharge end of said elongated tube but the total resistance to lubricant flow offered by said orifice and the restricted means communicating the storage space and the bearing being greater than the resistance to the flow of lubricant from said communicating tube to the discharge end of said elongated tube.

2. In rotating equipment, a bearing member to be lubricated, a storage space for lubricant communicating with said bearing member, means restricting the degree of communication between said space and said bearing member, means for supplying lubricant to said space, said lubricant supply means comprising an elongated lubricant passage having an inlet end and an open discharge end through which lubricant is adapted to be forced, a branch-lubricant passage communicating said first-mentioned passage at a point spaced from the discharge end thereof with said storage space, said elongated passage from said point to said discharge end thereof offering a first resistance to the flow of lubricant as it tends to flow therethrough, and means in said branch-passage offering a second resistance to the flow of lubricant tending to flow therethrough, said second resistance being slightly less than said first resistance, and said restricting means offering a third resistance to the flow of lubricant from said storage space to said bearing, the total of said second and third resistances being greater than said first resistance.

References Cited in the file of this patent

UNITED STATES PATENTS

| | | |
|---|---|---|
| 1,958,412 | Andrada | May 25, 1934 |
| 2,164,449 | Crow | July 4, 1939 |
| 2,272,757 | Teker | Feb. 10, 1942 |